United States Patent
Kumahashi

(10) Patent No.: US 12,108,009 B2
(45) Date of Patent: *Oct. 1, 2024

(54) INFORMATION PROCESSING SYSTEM, METHOD, AN ACCESS TOKEN FOR ACCESSING CLOUD SERVICE AND A DISPLAY UNIT TO DISPLAY REAUTHORIZATION OBJECT TO REISSUE THE ACCESS TOKEN FOR PERFORMING IMAGE PROCESSING FUNCTION, AND IMAGE FORMING APPARATUS

(71) Applicant: CANON KABUSHIKI KAISHA, Tokyo (JP)

(72) Inventor: Shu Kumahashi, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/317,730

(22) Filed: May 15, 2023

(65) Prior Publication Data

US 2023/0291861 A1 Sep. 14, 2023

Related U.S. Application Data

(63) Continuation of application No. 17/752,529, filed on May 24, 2022, now Pat. No. 11,689,684.

(30) Foreign Application Priority Data

May 28, 2021 (JP) ................. 2021-090423

(51) Int. Cl.
*H04N 1/44* (2006.01)
*G06F 21/60* (2013.01)
(Continued)

(52) U.S. Cl.
CPC ......... *H04N 1/4433* (2013.01); *G06F 21/608* (2013.01); *H04N 1/00244* (2013.01);
(Continued)

(58) Field of Classification Search
None
See application file for complete search history.

(56) References Cited

U.S. PATENT DOCUMENTS 11,689,684 B2 * 6/2023 Kumahashi ........... G06F 21/608
358/1.15
2017/0289275 A1 * 10/2017 Saito .................. H04N 1/00973
(Continued)

*Primary Examiner* — Haris Sabah
(74) *Attorney, Agent, or Firm* — Canon U.S.A., Inc. IP Division

(57) ABSTRACT

An information processing system includes a first external apparatus, a second external apparatus, an information processing apparatus, and an image forming apparatus. The information processing system further includes an issuance unit configured to issue, in the first external apparatus, an access token for accessing a cloud service, a first registration unit configured to receive the access token and register the access token in the second external apparatus in association with an identifier, a display unit configured to display a reauthorization instruction object on a browser of the information processing apparatus, and a second registration unit configured to, in a case where the reauthorization instruction object is pressed and the access token is issued again, register the reissued access token in the second external apparatus in association with the identifier.

13 Claims, 13 Drawing Sheets

(51) Int. Cl.
*H04N 1/00* (2006.01)
*H04W 12/0471* (2021.01)
(52) U.S. Cl.
CPC ..... *H04N 1/00411* (2013.01); *H04N 1/00464* (2013.01); *H04N 2201/0094* (2013.01); *H04W 12/0471* (2021.01)

(56) References Cited

U.S. PATENT DOCUMENTS

2019/0297166 A1* 9/2019 Hoshino ............... H04L 67/306
2020/0211409 A1* 7/2020 Latorre ................. G16H 10/60
2020/0379695 A1* 12/2020 Inoue ................... G06F 3/1271

* cited by examiner

FIG.11

| BUTTON SETTING NAME | BUTTON SETTING ID | SCAN BUTTON ID | PRINT BUTTON ID |
|---|---|---|---|
| BUTTON 1 | 1 | 11 | 12 |
| BUTTON 2 | 2 | 21 | 22 |
| BUTTON 3 | 3 | 31 | 32 |

INFORMATION PROCESSING SYSTEM, METHOD, AN ACCESS TOKEN FOR ACCESSING CLOUD SERVICE AND A DISPLAY UNIT TO DISPLAY REAUTHORIZATION OBJECT TO REISSUE THE ACCESS TOKEN FOR PERFORMING IMAGE PROCESSING FUNCTION, AND IMAGE FORMING APPARATUS

CROSS-REFERENCE TO RELATED APPLICATIONS

This application is a Continuation of U.S. patent application Ser. No. 17/752,529, filed May 24, 2022, which claims the benefit of Japanese Patent Application No. 2021-090423, filed May 28, 2021, both of which are hereby incorporated by reference herein in their entirety.

BACKGROUND

Field of the Disclosure

The present disclosure relates to an information processing system, a method for controlling the information processing system, and a storage medium.

Description of the Related Art

There is known a system that enables an image forming apparatus to use a service of a service providing server such as a cloud storage via a mediation server, as discussed in Japanese Patent Application Laid-Open No. 2017-184118. In such a system, a user authorizes the service providing server to give permission for the mediation server to use user data stored on the service providing server, and the service providing server issues, to the mediation server, an access token for using the service.

From a viewpoint of security, a validity period is generally specified for the access token. Accordingly, the mediation server can use the service of the service providing server within the validity period of the access token. In a case where the validity period of the access token is expired, the user is asked to perform reauthorization to make the service providing server issue the access token again.

According to the system discussed in Japanese Patent Application Laid-Open No. 2017-184118, every time the validity period of the access token is expired, the user is asked to perform a series of operations to give authority to the service providing server and then input an authentication ID, which is generated separately, to the image forming apparatus.

SUMMARY

In a case where the validity period of the access token is expired, it is desirable that the series of operations relating to the reissuance of the access token be minimized as much as possible. According to embodiments of the present disclosure, an information processing system including a first external apparatus, a second external apparatus, an information processing apparatus, and an image forming apparatus includes an issuance unit configured to issue, in the first external apparatus, an access token for accessing a cloud service, a first registration unit configured to receive the access token and register the access token in the second external apparatus in association with an identifier, a display unit configured to display a reauthorization instruction object on a browser of the information processing apparatus, and a second registration unit configured to, in a case where the reauthorization instruction object is pressed and the access token is issued again, register the reissued access token in the second external apparatus in association with the identifier.

Further features of the present disclosure will become apparent from the following description of exemplary embodiments with reference to the attached drawings.

BRIEF DESCRIPTION OF THE DRAWINGS

FIG. 11 is a table illustrating a relationship between a button setting and a button ID.

DESCRIPTION OF THE EMBODIMENTS

Hereinafter, exemplary embodiments of the present disclosure will be described in detail with reference to the appended drawings. The exemplary embodiments described below are not intended to limit the present disclosure, and not all combinations of features described in the exemplary embodiments are necessarily deemed to be essential.

A first exemplary embodiment of the present disclosure will be described.

Figure 1:
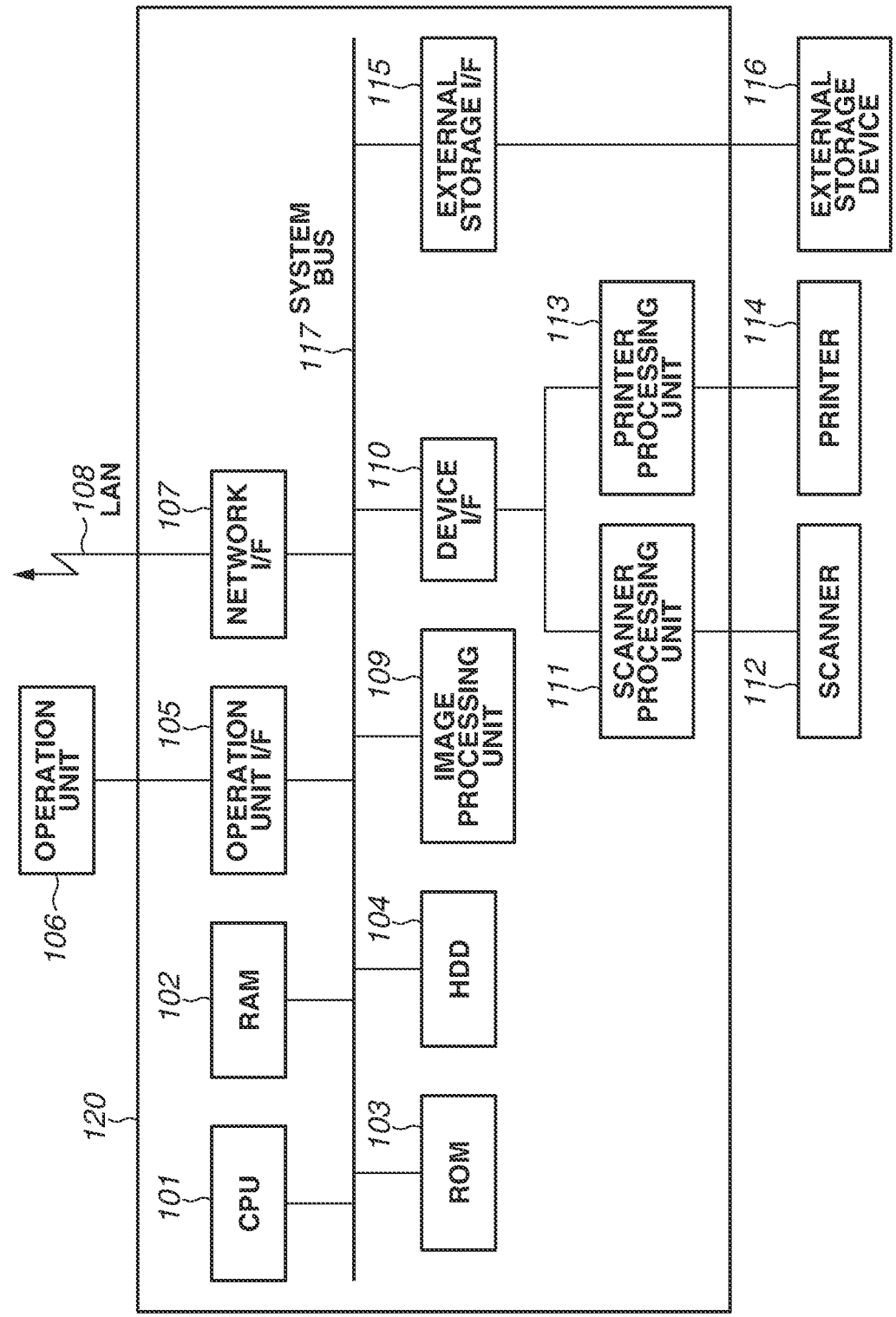
FIG. 1 is a block diagram illustrating a hardware configuration of an image forming apparatus.

FIG. 1 is a block diagram illustrating a hardware configuration of an image forming apparatus 100. As illustrated in FIG. 1, in the present exemplary embodiment, the image forming apparatus 100 is configured for example as a multifunction peripheral (MFP) in which a plurality of functions such as a scan function and a print function are integrated. The image forming apparatus 100 includes a controller unit 120 that controls the entire image forming apparatus 100, an operation unit 106, a scanner 112, and a printer 114. The operation unit 106 includes a numerical keypad and various hard keys for accepting input of an instruction such as a job execution instruction from a user, and also includes a display panel for presenting, to the user, apparatus information, job progress information, and a setting screen of a function executable by the image forming apparatus 100. The scanner 112 is an image input device that optically reads an image of a document placed thereon. The printer 114 is an image output device that prints an image on a recording medium, such as printing paper, based on image data.

The operation unit 106 is connected to an operation unit interface (I/F) 105 included in the controller unit 120. The scanner 112 and the printer 114 are connected to a scanner processing unit 111 and a printer processing unit 113 in the controller unit 120, respectively. With the above-described configuration, each of the operation unit 106, the scanner 112, and the printer 114 is controlled to operate by the controller unit 120.

An external storage device 116 such as a universal serial bus (USB) memory medium can be connected to the image forming apparatus 100 as appropriate. At this time, the external storage device 116 is connected thereto via an external storage I/F 115 and is controlled to operate by the controller unit 120.

The controller unit 120 includes a central processing unit (CPU) 101 that comprehensively controls respective blocks of the controller unit 120. The CPU 101 is connected to a random access memory (RAM) 102, a read only memory (ROM) 103, a hardware disk drive (HDD) 104, and the operation unit I/F 105 via a system bus 117. The CPU 101 is also connected to a network I/F 107, a fax I/F (not illustrated), an image processing unit 109, a device I/F 110, and the external storage I/F 115 via the system bus 117. The RAM 102 is a general-purpose memory that provides a work area to the CPU 101. The RAM 102 is also used as a memory for temporarily storing a parameter and a setting value, or used as an image memory for storing image data in predetermined units such as page units. For example, the ROM 103 is a general-purpose memory serving as a boot ROM for storing a system boot program. The HDD 104 stores a system software program, history data, and a table. For example, a function of the image forming apparatus 100 is implemented by the CPU 101 loading a program stored in the ROM 103 into the RAM 102 and executing the program.

The operation unit I/F 105 is used to input and output information from and to the operation unit 106. The operation unit I/F 105 outputs display data to the operation unit 106 according to an instruction from the CPU 101, and transmits to the CPU 101 information input by the user through the operation unit 106.

The network I/F 107 is connected to a wired or wireless local area network (LAN) 108, and enables the image forming apparatus 100 to input and output information from and to a device on the LAN 108. The network I/F 107 has a configuration supporting the LAN 108. For example, the network I/F 107 may have a configuration supporting Near Field Communication at a radio distance of several tens of centimeters. In this case, mutual communication is performed between the image forming apparatus 100 and a portable wireless terminal.

The image processing unit 109 performs general image processing. For example, the image processing unit 109 performs processing, such as enlargement and reduction processing, rotation processing, and conversion processing, on image data acquired from an external apparatus via the LAN 108. The image processing unit 109 also performs processing for rasterizing a page-description language (PDL) code received via the LAN 108 into a bitmap image. Furthermore, in the case of output from the printer 114 via the printer processing unit 113, the image processing unit 109 performs processing for converting compressed and encoded image data stored in the RAM 102 into image data of a format processible by the printer processing unit 113.

The device I/F 110 is connected to the scanner 112 and the printer 114 via the scanner processing unit 111 and the printer processing unit 113, respectively, and performs synchronous/non-synchronous conversion of image data and transmission of a setting value and an adjustment value. Furthermore, the device I/F 110 transmits state information about the scanner 112 and the printer 114 to the CPU 101. For example, the state information includes information about an error such as a jam occurring in the scanner 112 or the printer 114.

The scanner processing unit 111 performs various types of processing corresponding to the scan function, such as data correction, data processing, image area separation, scaling, and binarization processing, on the data read and input by the scanner 112. The scanner 112 includes an automatic continuous document feeder (not illustrated) and a pressing plate reader (not illustrated), and can perform reading of a document placed on a platen glass and both-side reading of a plurality of sheets of a document. Furthermore, sensors that detect opening or closing of a feeder cover (not illustrated), opening or closing of a document cover (not illustrated), presence or absence of a document, and a document size are provided in the scanner 112. Detection signals from these sensors and the state information about the scanner 112 are transmitted to the CPU 101 via the scanner processing unit 111 and the device I/F 110, so that the CPU 101 recognizes the state of the scanner 112 such as occurrence or elimination of an error.

Depending on the output characteristics of the printer 114, the printer processing unit 113 performs various types of processing corresponding to the print function, such as output correction, resolution conversion, and image print position adjustment, on the image data to be printed and output. The printer 114 includes one or more sheet feeding cassettes (not illustrated) for storing printing sheets, one or more toner trays (not illustrated) for storing toner, and a sheet feeding unit (not illustrated) capable of feeding the sheets from each sheet feeding cassette one by one. The printer 114 further includes a marking unit (not illustrated) for printing a toner image on the fed sheet, and a fixing unit (not illustrated) for fixing the toner image printed by the marking unit to the sheet by applying heat and pressure thereto. Sensors that detect an opening or closing state of each sheet feeding cassette, an amount of sheets remaining in each sheet feeding cassette, an opening or closing state of each toner tray, opening or closing of a sheet feeding unit cover (not illustrated), presence or absence of toner, and a position of the sheet being fed are provided in the printer 114. Detection signals from these sensors and the state information about the printer 114 are transmitted to the CPU 101 via the printer processing unit 113 and the device I/F 110, so that the CPU 101 recognizes the state of the printer 114 such as occurrence or elimination of an error.

While the external storage device 116 is connected to the external storage I/F 115, the external storage I/F 115 reads data saved in the external storage device 116 or writes data to the external storage device 116, according to an instruction from the CPU 101.

Figure 2:
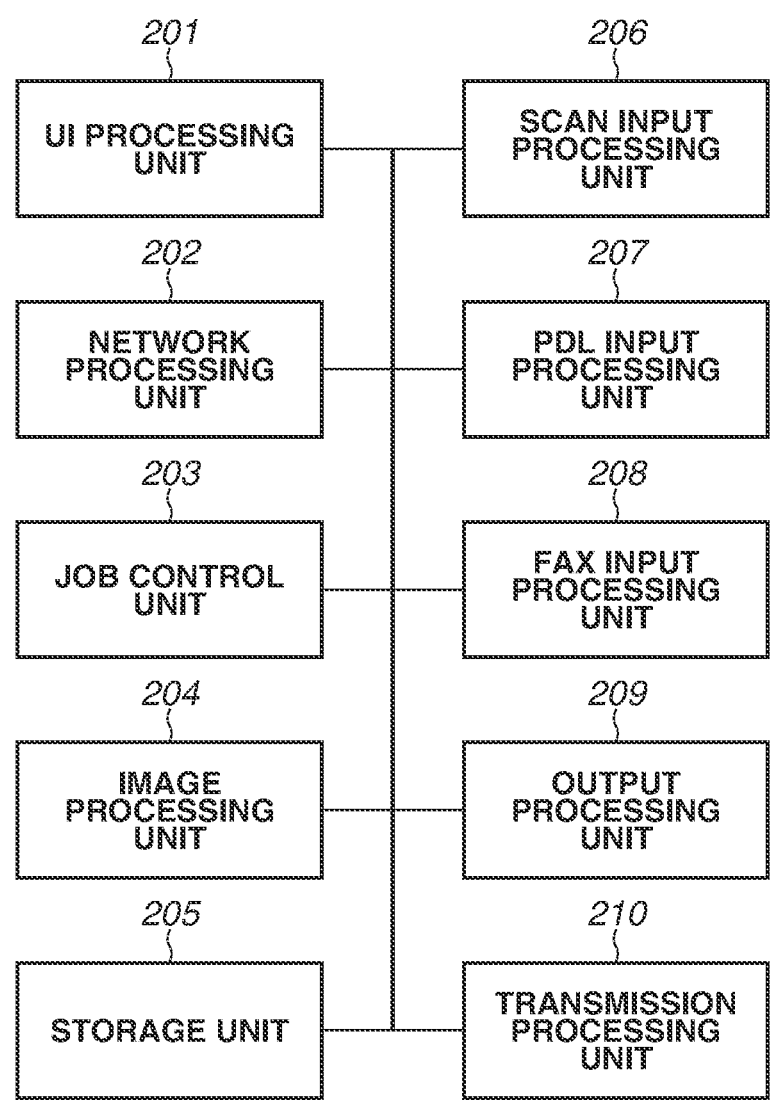
FIG. 2 is a block diagram illustrating a software module configuration of the image forming apparatus.

FIG. 2 is a block diagram illustrating a software module configuration of the image forming apparatus 100. Each of modules in FIG. 2 is implemented by the CPU 101 executing a program.

A user interface (UI) processing unit 201 performs processing relating to the operation unit I/F 105 or the operation unit 106. The UI processing unit 201 notifies another module of an operation performed by the user on the operation unit 106, as appropriate, and displays a screen on the operation unit 106 according to an instruction from another module. Furthermore, the UI processing unit 201 edits rendering data to be displayed on the operation unit 106.

A network processing unit 202 performs processing for communicating with a device on the LAN 108 via the network I/F 107. The network processing unit 202 receives information such as a control command and data from a device on the LAN 108, and notifies another module of the information. The network processing unit 202 also transmits a control command and data to a device on the LAN 108 according to an instruction from another module.

A job control unit 203 controls the other modules to comprehensively control execution of jobs such as a copy job, a print job, and a fax job in the image forming apparatus 100. When a job is submitted to the job control unit 203 from the UI processing unit 201 or the network processing unit 202, the job control unit 203 determines a type of the job and instructs one of input processing units (a scan input processing unit 206, a PDL input processing unit 207, and a fax input processing unit 208) suitable for the type to perform processing for generating an image to be printed. For example, the job control unit 203 issues an execution instruction to the scan input processing unit 206 when a copy job is submitted, and issues an execution instruction to the PDL input processing unit 207 when a PDL job is submitted. Each of the input processing units generates an image for each page, saves the image in a storage unit 205, and notifies the job control unit 203 of the image. The job control unit 203 receives the notification and instructs an output processing unit 209 to perform processing for printing the image on a recording medium. Image printing is implemented by repeating the above series of control the number of times corresponding to pages of the job.

In response to an instruction from each of the input processing units or the output processing unit 209, an image processing unit 204 performs image processing through software or through hardware using the image processing unit 109. The image processing unit 204 also performs image division processing and handwriting determination processing.

The storage unit 205 reads and writes data from and to the RAM 102 and the HDD 104. The storage unit 205 saves various types of data according to an instruction from another module.

In response to an instruction from the job control unit 203, the scan input processing unit 206 controls the scanner processing unit 111 and the scanner 112 to perform reading processing on the document placed on the scanner 112. The scan input processing unit 206 controls the scanner processing unit 111 to perform image processing on the read image data. Furthermore, the scan input processing unit 206 acquires the state information about the scanner processing unit 111 and the scanner 112, and notifies the job control unit 203 of the state information. In a case where the scan input processing unit 206 receives an interruption instruction from the job control unit 203, the scan input processing unit 206 can interrupt the document reading processing and the image generation processing.

In response to an instruction from the job control unit 203, the PDL input processing unit 207 analyzes PDL data received via the network processing unit 202, and rasterizes the PDL data into a bitmap image on a page-by-page basis. The bitmap image is saved in a storage area by the storage unit 205. In a case where the PDL input processing unit 207 receives an interruption instruction from the job control unit 203, the PDL input processing unit 207 can interrupt the PDL analysis processing and the image generation processing.

In response to an instruction from the job control unit 203, the fax input processing unit 208 performs processing for converting data received via the network processing unit 202 into a binary image on a page-by-page basis. The binary image is saved in the storage area by the storage unit 205.

In response to an instruction from the job control unit 203, the output processing unit 209 controls the image processing unit 204, the printer processing unit 113, and the printer 114 to perform image processing appropriate for image data generated by each of the input processing units, and prints the image data on a recording medium. Furthermore, the output processing unit 209 acquires the state information about the printer processing unit 113 and the printer 114 and notifies the job control unit 203 of the state information. In addition, while performing print processing on a job, the output processing unit 209 does not perform print processing on another job. However, the output processing unit 209 may interrupt the processing being performed on the job and start the processing on another job in a case where the output processing unit 209 receives a priority update notification from the job control unit 203.

In response to an instruction from the job control unit 203, a transmission processing unit 210 controls the image processing unit 204 and the network processing unit 202 to transmit an image to a device on the LAN 108.

Figure 3:
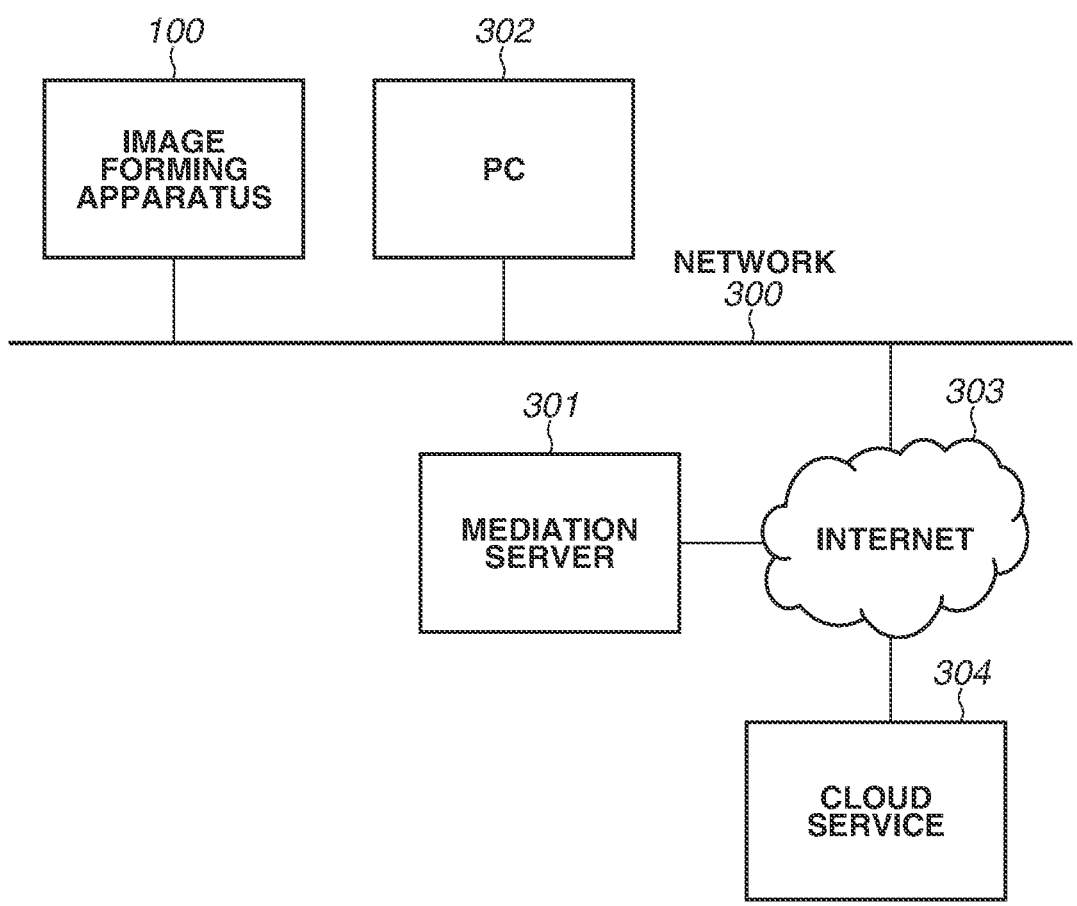
FIG. 3 is a block diagram illustrating a network configuration.

FIG. 3 is a block diagram illustrating a network configuration according to the present exemplary embodiment. In other words, FIG. 3 illustrates an information processing system in which a plurality of apparatuses is connected to each other. The image forming apparatus 100 and a personal computer (PC) 302 (an information processing apparatus) are communicably connected to each other via a network 300. Furthermore, the network 300 is connected to the internet 303, so that a mediation server 301 (a second external apparatus) is communicable with the image forming apparatus 100 and a cloud service 304 (a first external apparatus). The mediation server 301 serves to mediate communication between the image forming apparatus 100 and the cloud service 304. The cloud service 304 refers to a known storage service providing server. In FIG. 3, the single cloud service 304 is illustrated for the sake of convenience, but practically, a plurality of the cloud services 304 exists. In an example to be described below, the user selects a desired one from the plurality of cloud services 304.

Hereinafter, an application called "Cloud Link Print & Scan" will be described. The Cloud Link Print & Scan is installed on the image forming apparatus 100, and enables the image forming apparatus 100 to cooperate with the cloud service 304 via the mediation server 301.

Figure 4:
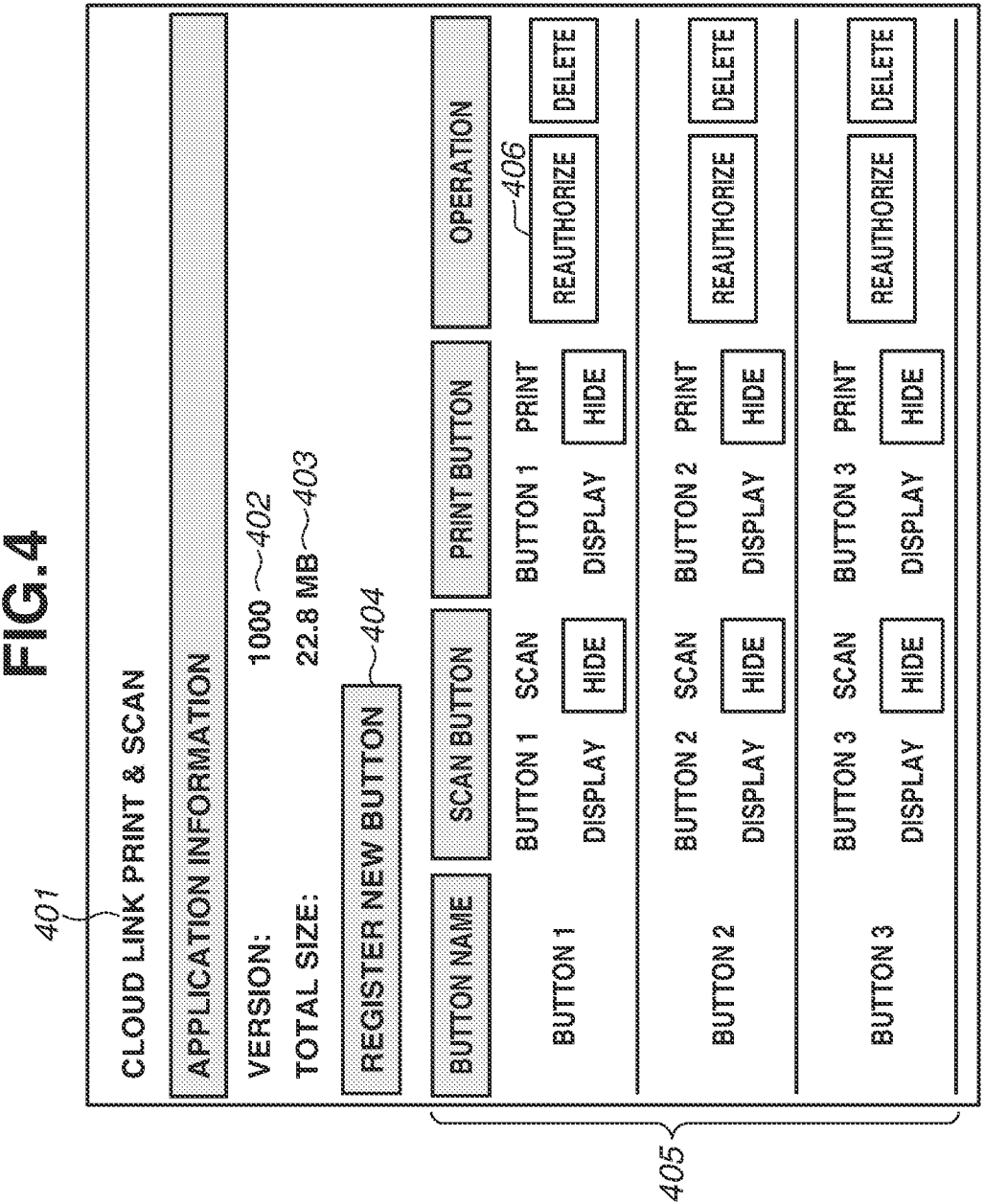
FIG. 4 is a diagram illustrating a button management screen of a Cloud Link Print & Scan application.

FIG. 4 illustrates a management screen of the Cloud Link Print & Scan installed on the image forming apparatus 100. The management screen is displayed on a display unit of the PC 302 when the user accesses the image forming apparatus 100 from a browser of the PC 302. An application name 401 is an area for displaying a name of an application, and the name of the "Cloud Link Print & Scan" application is displayed thereon. Based on a predetermined setting, the Cloud Link Print & Scan transmits the data scanned by the scanner 112 of the image forming apparatus 100, to the cloud service 304 via the mediation server 301. The Cloud Link Print & Scan also downloads the data saved in the cloud service 304, via the mediation server 301 and performs printing. The user can register a plurality of settings (also referred to as "button settings") and can change, for each of the settings, a communication destination cloud setting, a scan setting, and a print setting.

A version information 402 is an area for displaying a version of the application. A size information 403 is an area for displaying a size of a storage area used by the application. A Register New Button 404 is an object used to newly register a button setting. When the Register New Button 404 is pressed, the management screen transitions to a button setting edit screen (described below). A button setting list 405 is an area for displaying a list of registered button settings. One button setting is displayed in two rows, where the user can confirm a representative button name, a scan button name and a display setting corresponding thereto, and a print button name and a display setting corresponding thereto. A Reauthorize button 406 (a reauthorization instruction object) is used to start reauthorization processing when an authorization period is expired (described below). The Reauthorize button 406 is provided for each of the button settings because the authorization period varies among the button settings. The Reauthorize button 406 may be displayed if the authorization period is expired, or may constantly be displayed even if the authorization period is not expired. Even if the authorization period is not expired, the reauthorization processing is to be started when the Reauthorize button 406 is pressed.

A Delete button for deleting an unnecessary button setting is also displayed for each of the button settings. It is assumed that three button settings, Buttons 1, 2, and 3 are registered, and the following description will be given based on the assumption.

Figure 5:
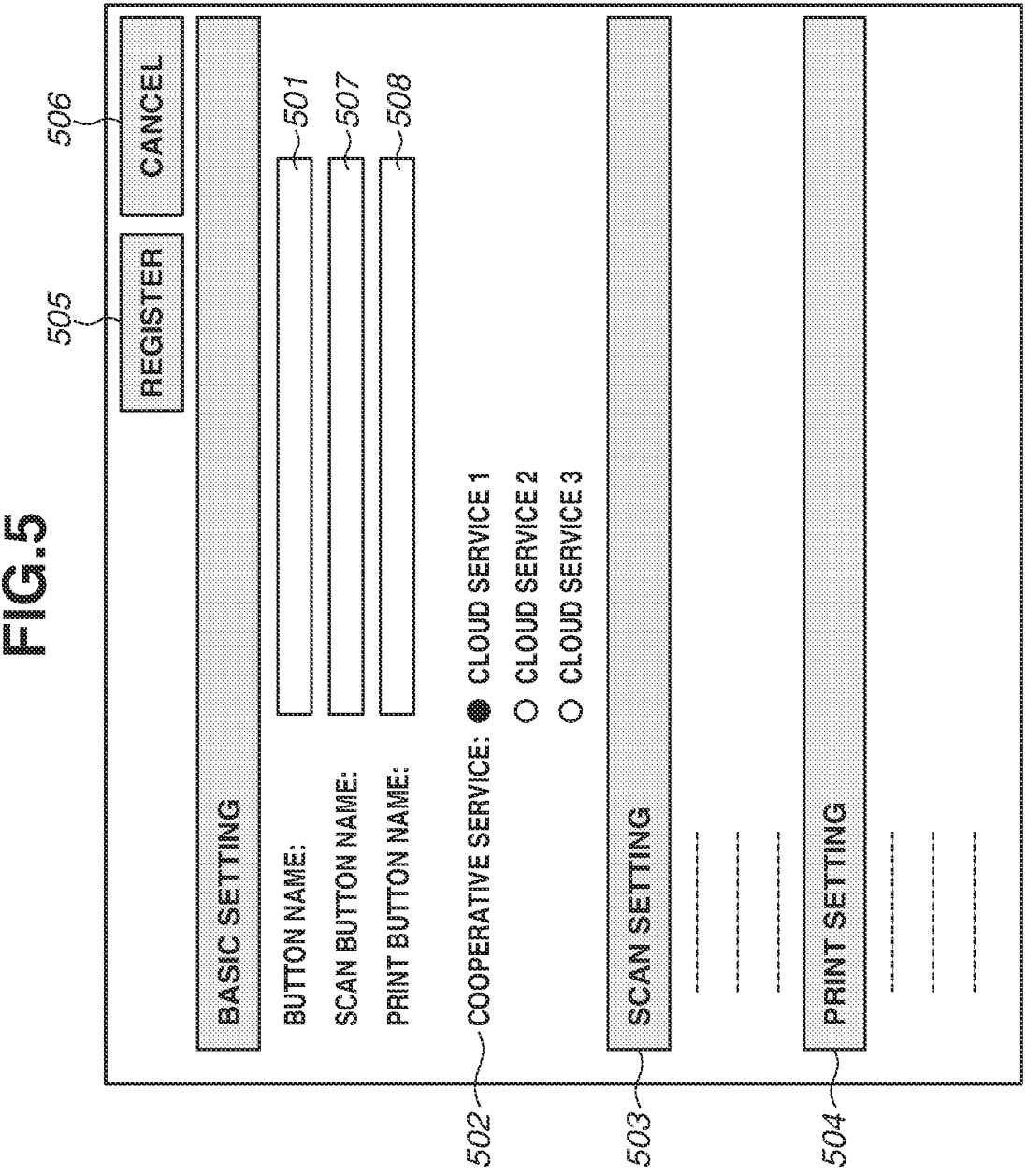
FIG. 5 is a diagram illustrating a button registration screen of the Cloud Link Print & Scan application.

FIG. 5 illustrates the button setting edit screen of the Cloud Link Print & Scan. A button name input field 501 is an area for inputting a button name. The input button name is used in the above-described button setting list 405. A scan button name input field 507 is an area for inputting a scan button name. The input scan button name is used as a name of a scan button (described below). A print button name input field 508 is an area for inputting a print button name. The input print button name is used as a name of a print button (described below). To display a total of two buttons for the Cloud Link Print & Scan, i.e., a button for executing scanning and a button for executing printing, on a home screen (see FIG. 7 described below), a different button name can be set for each of the buttons to distinguish one button from the other. A cooperative service selection field 502 is an area where the user selects a desired cloud service as the communication destination. Options displayed on the cooperative service selection field 502 depend on a support list (described below) acquired from the mediation server 301. In the present exemplary embodiment, cloud services 1 to 3 are displayed as examples, but selectable services may be changed depending on the exemplary embodiment. A scan setting field 503 is an area for setting a scan setting. Setting items such as a reading size and a color mode are displayed depending on the exemplary embodiment. A print setting field 504 is an area for setting a print setting. Setting items such as a sheet feeding unit and a sheet size are displayed depending on the exemplary embodiment. A Register button 505 is used to register a button setting with input setting items. When the Register button 505 is pressed, the button setting is saved in the storage area of the Cloud Link Print & Scan, and the two corresponding buttons, i.e., the scan button and the print button are displayed on the home screen (described below) of the image forming apparatus 100. In a case where user authentication is to be performed for the selected cloud service, the button setting edit screen transitions to an authentication screen provided by the cloud service after the Register button 505 is pressed. A Cancel button 506 is used to cancel the registration of the new button setting.

When the Cancel button 506 is pressed, registration processing is ended without saving the input setting items.

Figure 6:
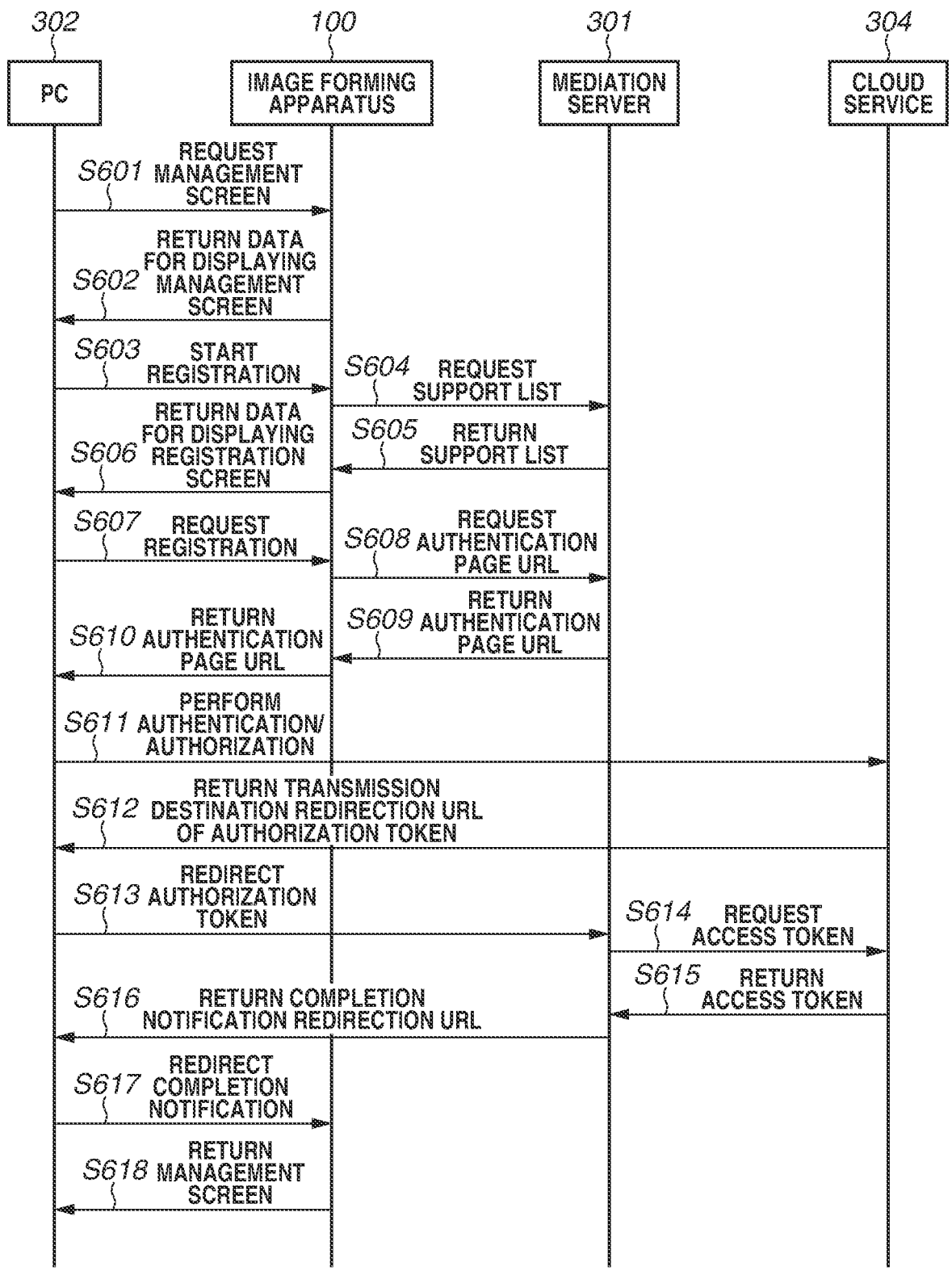
FIG. 6 is a sequence diagram illustrating authentication and authorization of a cloud service.

FIG. 6 is a sequence diagram illustrating the registration of a button setting in the image forming apparatus 100, and authentication and authorization of the mediation server 301 and the cooperated cloud service 304. The apparatuses illustrated in the sequence diagram communicate with each other through Hyper-Text Transfer Protocols (HTTPs).

In step S601, the user specifies, in a web browser of the PC 302, a uniform resource locator (URL) of the management screen (see FIG. 4) of the Cloud Link Print & Scan installed on the image forming apparatus 100. This enables the PC 302 to request the image forming apparatus 100 to provide the management screen of the Cloud Link Print & Scan.

In step S602, the image forming apparatus 100 returns, to the PC 302, data for displaying the management screen of the Cloud Link Print & Scan. The PC 302 receives the data and displays the management screen of the Cloud Link Print & Scan on the web browser.

In step S603, the user presses the Register New Button 404. This enables the PC 302 to request the image forming apparatus 100 to provide the button setting edit screen (see FIG. 5) of the Cloud Link Print & Scan.

In step S604, the image forming apparatus 100 requests the mediation server 301 to provide a support list. The support list refers to a list of clouds supported by the mediation server 301. Generally, the image forming apparatus 100 is to perform authentication in order to communicate with the mediation server 301. An authentication method such as a Basic authentication or an OAuth authentication can be selected as appropriate depending on the exemplary embodiment. In the present exemplary embodiment, authentication between the image forming apparatus 100 and the mediation server 301 is not an essential point, and a description thereof will thus be omitted.

In step S605, the mediation server 301 returns the support list to the image forming apparatus 100.

In step S606, the image forming apparatus 100 returns, to the PC 302, data for displaying the button setting edit screen of the Cloud Link Print & Scan. At this time, data to be returned as the options of the cooperative service selection field 502 is changed depending on the support list received in step S605.

The PC 302 receives the data and displays the button setting edit screen of the Cloud Link Print & Scan on the web browser.

In step S607, the user inputs a button setting and presses the Register button 505. This enables the PC 302 to request the image forming apparatus 100 to register the button setting for the Cloud Link Print & Scan.

In step S608, the image forming apparatus 100 saves the button setting received from the PC 302, in the storage unit 205. At this time, the image forming apparatus 100 saves the button setting together with a unique identifier (ID). Furthermore, the image forming apparatus 100 transmits a request for an authentication page URL to the mediation server 301 together with the unique ID and a completion notification redirection URL. The unique ID is generated when a button is generated, so that one unique ID is generated for one button. The unique ID is different from a button setting ID. The authentication page URL refers to a URL of an authentication web page of the cooperative service selected from the plurality of cloud services 304 by the user in step S607. Generally, to use a cloud service from another service (the mediation server 301 in the present example), the user is to authorize "the use of the cloud service from another service" on the cloud service. To authorize the use thereof, the user is to log in the cloud service for authentication and perform specified operations. The URL of the authentication web page is requested for that purpose. The completion notification redirection URL is an URL specified as a redirection destination by the mediation server 301 after completion of authorization processing (described below), and a URL of the management screen (see FIG. 4) of the Cloud Link Print & Scan is specified as the completion notification redirection URL.

In step S609, the mediation server 301 saves the received unique ID and completion notification redirection URL as a pair. The mediation server 301 then returns the authentication page URL to the image forming apparatus 100. At this time, the mediation server 301 attaches, to the authentication page URL, information corresponding to the unique ID (which is a character string generated from the unique ID using a desired algorithm) and a transmission destination redirection URL of an authorization token of the cloud service 304. The mediation server 301 is specified for the transmission destination redirection URL of the authorization token.

In step S610, the image forming apparatus 100 returns the authentication page URL to the PC 302.

In step S611, the web browser of the PC 302 redirects the information to the returned authentication page URL. At this time, the cloud service 304 acquires the information corresponding to the unique ID and the transmission destination redirection URL of the authorization token, as the accompanying information of the authentication page URL. The user performs the above-described login operation and authorization operation via the authentication page.

In step S612, the cloud service 304 returns, to the PC 302, the transmission destination redirection URL of the authorization token together with the information corresponding to the unique ID and the authorization token.

In step S613, the web browser of the PC 302 redirects the information to the mediation server 301. Because the information corresponding to the unique ID and the authorization token are attached to the redirected information, the mediation server 301 can acquire the unique ID and the authorization token as a pair.

In step S614, the mediation server 301 uses the authorization token acquired in step S613 to request the cloud service 304 to provide an access token.

In step S615, the cloud service 304 returns the access token to the mediation server 301. From this time on, the mediation server 301 can use a service of the cloud service 304 (e.g., upload and download of data to and from the cloud service 304) by using the access token to communicate with the cloud service 304. Furthermore, the mediation server 301 manages the access token in association with the unique ID. Thus, from this time on, the mediation server 301 can determine the access token to be used in mediating between the image forming apparatus 100 and the cloud service 304.

In step S616, the mediation server 301 returns, to the PC 302, the completion notification redirection URL associated with the unique ID saved in step S609.

In step S617, the web browser of the PC 302 redirects a completion notification to the destination indicated by the completion notification redirection URL, i.e., the image forming apparatus 100.

In step S618, the image forming apparatus 100 returns the management screen (see FIG. 4) of the Cloud Link Print & Scan to the PC 302.

Through the above-described sequence, the image forming apparatus 100 can use a service of the cloud service 304 via the mediation server 301. However, the access token issued by the cloud service 304 in step S615 has a validity period. When the validity period is expired, the user is to perform reauthorization to issue the access token again. Reauthorization can be started when the above-described Reauthorize button 406 in FIG. 4 is pressed.

Figure 7:
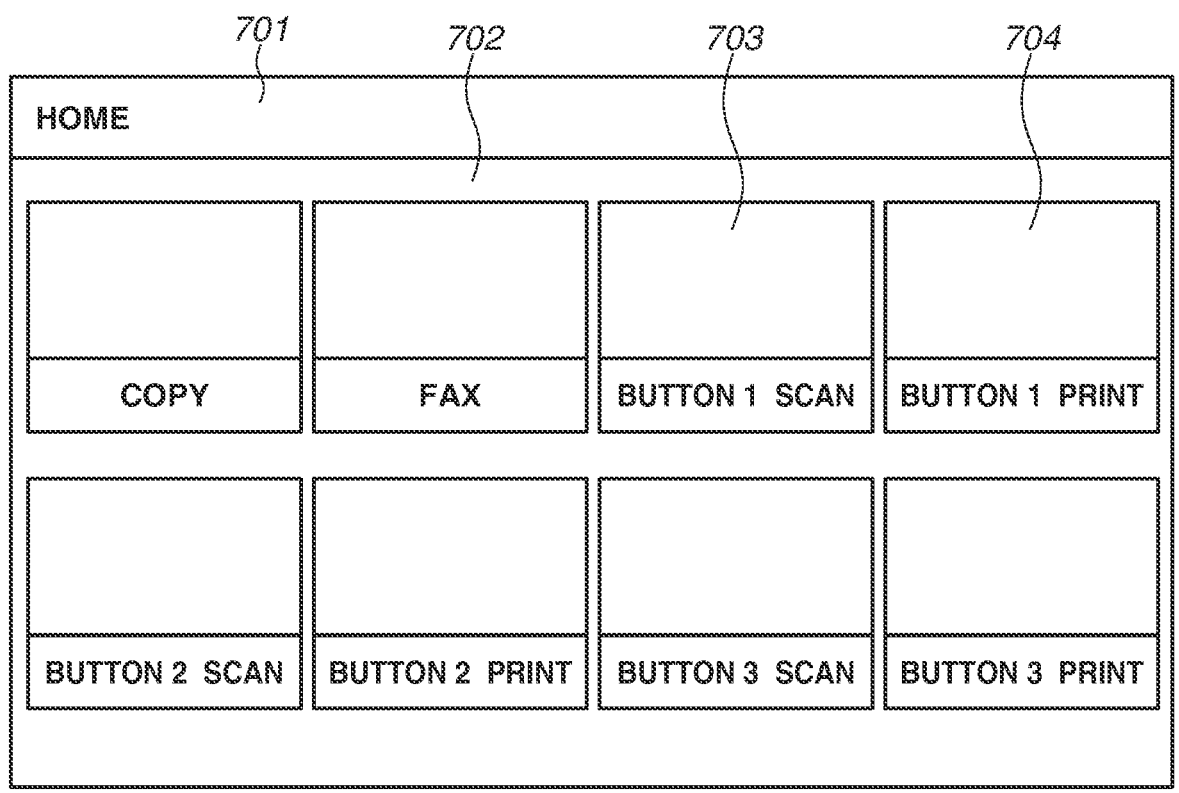
FIG. 7 is a diagram illustrating a home screen displayed on the image forming apparatus.

FIG. 7 illustrates an example of the home screen displayed on the operation unit 106 of the image forming apparatus 100. A screen name 701 is an area for displaying a name of a screen currently displayed on the operation unit 106. A button display area 702 is an area for displaying buttons as triggers for performing the functions of the image forming apparatus 100. The displayed buttons are associated with specific functions (e.g., a copy function and a fax function) of the image forming apparatus 100. The user can perform a desired function by pressing the corresponding button. A Cloud Link Scan button 703 is the scan button corresponding to the Button 1 in FIG. 4. When the Cloud Link Scan button 703 is pressed, the image forming apparatus 100 executes scanning based on the scan setting for the Button 1, and transmits scanned data to the cloud service set for the button 1. "Button 1 Scan" in FIG. 7 corresponds to the scan button name set via the screen in FIG. 5. A Cloud Link Print button 704 is the print button corresponding to the Button 1 in FIG. 4. When the Cloud Link Print button 704 is pressed, the image forming apparatus 100 downloads data saved in the cloud service set for the Button 1, and prints the data based on the print setting for the Button 1. The other displayed buttons in FIG. 7 correspond to the Button 2 or 3 in FIG. 4.

Figure 8:
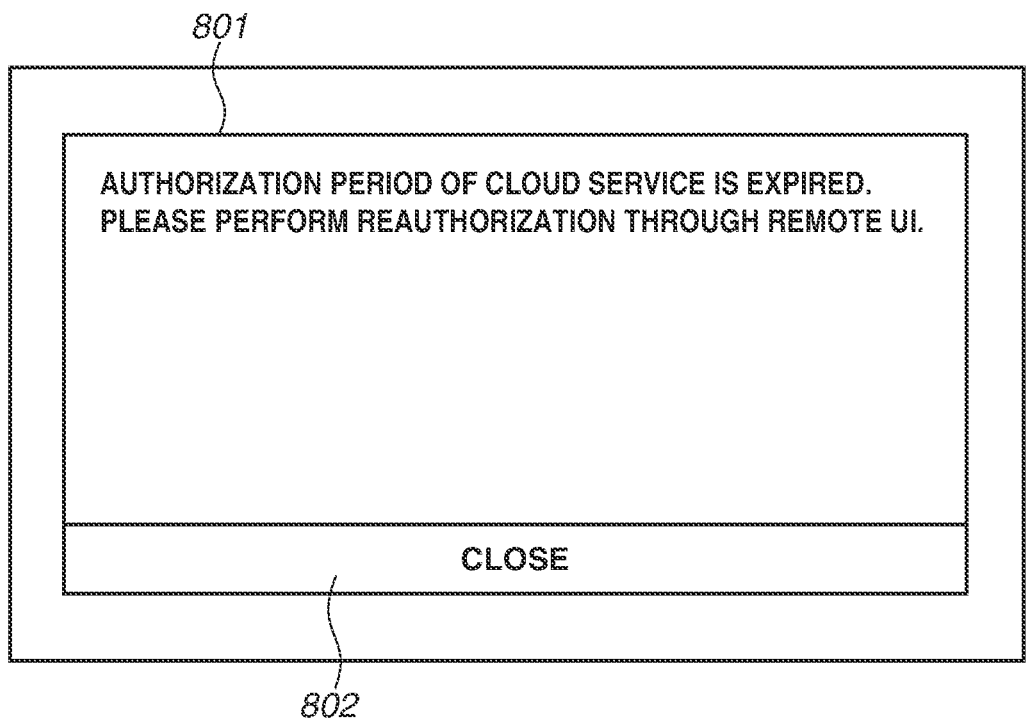
FIG. 8 is a diagram illustrating an authorization period expiration screen displayed on the image forming apparatus.

FIG. 8 illustrates an authorization period expiration screen displayed on the operation unit 106 of the image forming apparatus 100 in a case where the authorization period of the access token saved in the mediation server 301 is expired when the Cloud Link Scan button 703 or the Cloud Link Print button 704 is pressed. A written description 801 describes an operation to be performed by the user in order to eliminate an authorization period expiration error. The authorization period expiration screen is closed when a Close button 802 is pressed.

Figure 9:
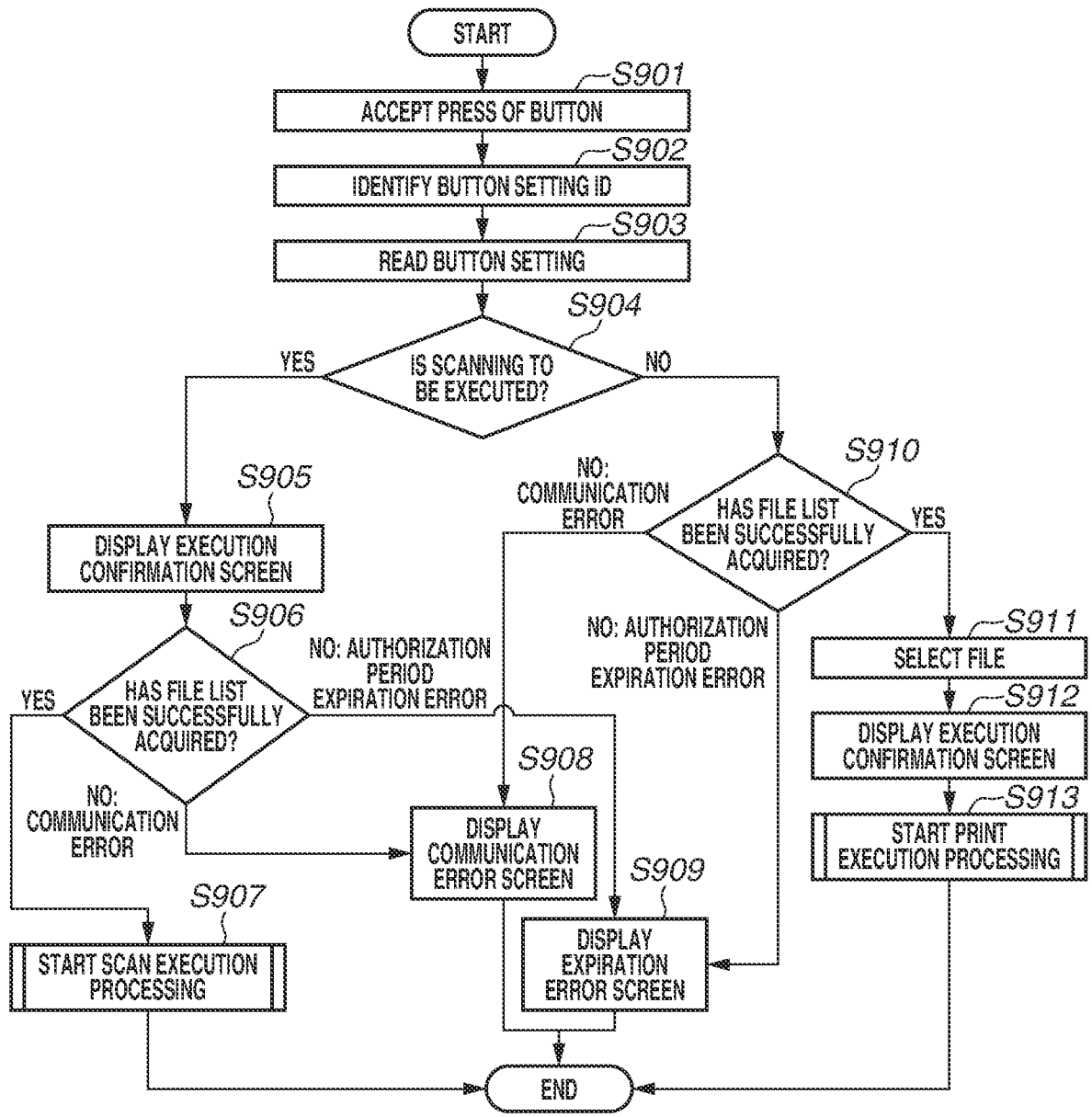
FIG. 9 is a flowchart illustrating processing to be performed when a button for the Cloud Link Print & Scan application is pressed.

FIG. 9 is a flowchart illustrating processing to be performed by the image forming apparatus 100 when a button is pressed. The processing in this flowchart is implemented by the CPU 101 loading a program stored in the ROM 103 into the RAM 102 and executing the program.

In step S901, the CPU 101 accepts press of a button by the user. In the present exemplary embodiment, a description will be given assuming that the Cloud Link Scan button 703 in FIG. 6 is pressed.

In step S902, the CPU 101 identifies the button setting ID. FIG. 11 is a table illustrating current button settings and IDs of the buttons displayed on the home screen. Practically, the image forming apparatus 100 does not save this table, but saves the button setting names and the button setting IDs. In the present exemplary embodiment, a scan button ID and a print button ID are generated from each of the button setting IDs and are associated with the displayed button. The scan button ID is obtained by multiplying the button setting ID by 10 and adding 1 to the multiplied value. The print button ID is obtained by multiplying the button setting ID by 10 and adding 2 to the multiplied value. In this example, the button associated with the scan button ID 11 is pressed because the Cloud Link Scan button 703 corresponds to the Button 1. The button setting ID is thus 1.

In step S903, the CPU 101 reads the button setting based on the button setting ID identified in step S902.

In step S904, the CPU 101 determines whether to execute scanning or printing. If a remainder after dividing the scan button ID or the print button ID by 10 is 1, scanning is to be executed (YES in step S904) and the processing proceeds to step S905. If the remainder is 2, printing is to be executed (NO in step S904) and the processing proceeds to step S910.

In step S905, the CPU 101 displays an execution confirmation screen (not illustrated) for the Cloud Link Scan. This step can be skipped depending on the setting.

In step S906, the CPU 101 tries to acquire a file list from the cloud service 304 by transmitting a file list acquisition request to the mediation server 301. If a file list has been successfully acquired (YES in step S906), the processing proceeds to step S907. If a communication error has occurred (NO: COMMUNICATION ERROR in step S906), the processing proceeds to step S908. If an authorization period expiration error is returned from the mediation server 301 (NO: AUTHORIZATION PERIOD EXPIRATION ERROR in step S906), the processing proceeds to step S909.

In step S907, the CPU 101 executes the Cloud Link Scan based on the button setting read in step S903. Because the subsequent processing departs from an essential point, detailed description thereof will be omitted. Because the CPU 101 communicates with the mediation server 301 several times during scan processing, there is a possibility of occurrence of the above-described communication error or authorization period expiration error. In such a case, the processing proceeds to step S908 or S909.

In step S908, the CPU 101 displays a communication error screen (not illustrated) and ends the processing.

In step S909, the CPU 101 displays the authorization period expiration screen illustrated in FIG. 8. The processing is ended when the Close button 802 is pressed.

In step S910, similarly to the processing in step S906, the CPU 101 tries to acquire a file list. If a file list has been successfully acquired (YES in step S910), the processing proceeds to step S911. If a communication error has occurred (NO: COMMUNICATION ERROR in step S910), the processing proceeds to step S908. If an authorization period expiration error has occurred (NO: AUTHORIZATION PERIOD EXPIRATION ERROR in step S910), the processing proceeds to step S909.

In step S911, the CPU 101 displays a file selection screen (not illustrated) so that the user selects a desired file to be printed. The number of selectable files can be changed depending on the exemplary embodiment.

The selected file is added to a selected file list.

In step S912, the CPU 101 displays an execution confirmation screen (not illustrated) for the Cloud Link Print. This step can be skipped depending on the setting.

In step S913, the CPU 101 executes the Cloud Link Print based on the button setting read in step S903. Details thereof will be described below with reference to FIG. 13.

As described above, in a case where an authorization period expiration error is returned from the mediation server 301 when the Cloud Link Scan (or Print) is to be executed, the image forming apparatus 100 can prompt the user to perform reauthorization by displaying a dedicated error screen (see FIG. 8).

Figure 10:
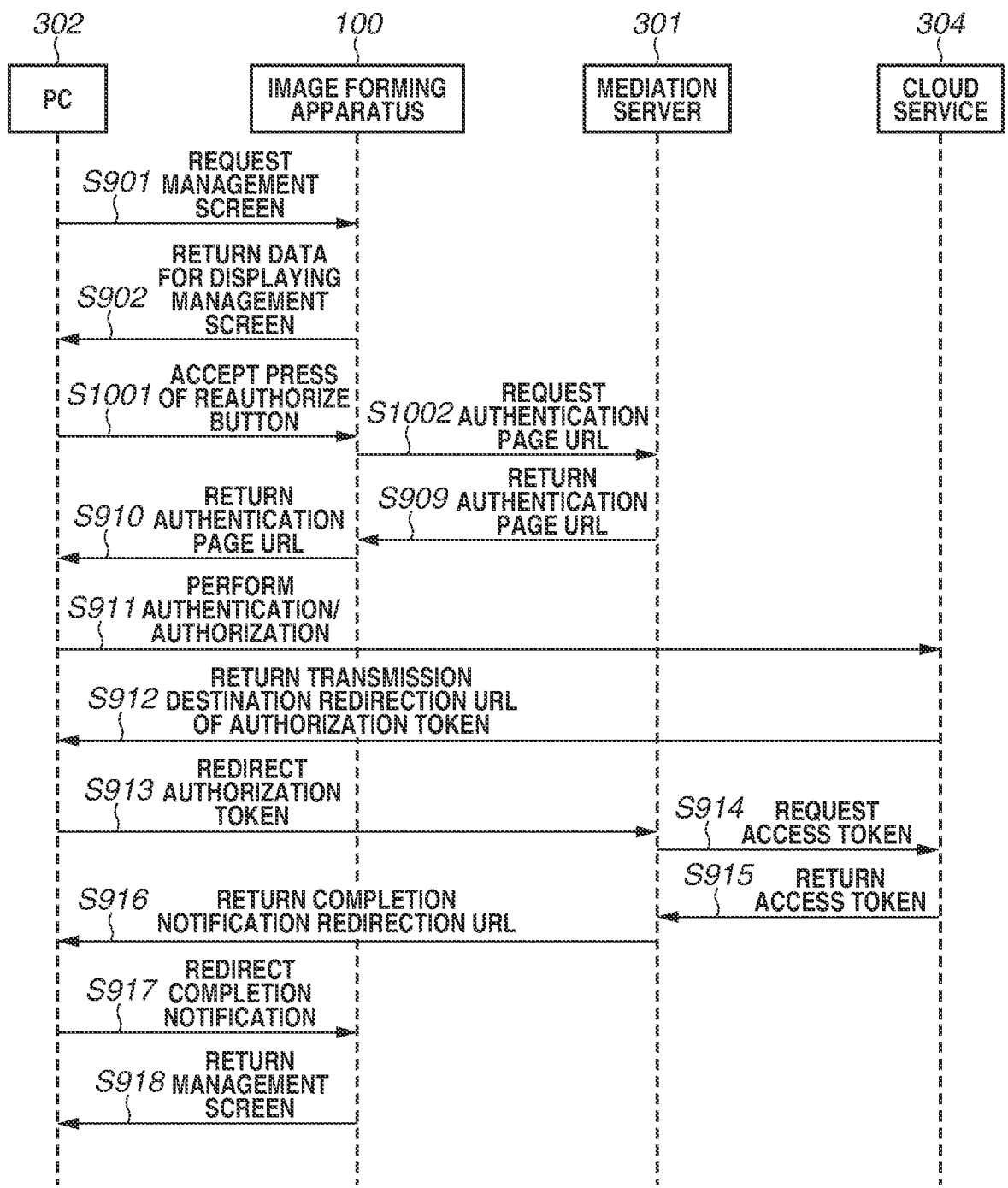
FIG. 10 is a sequence diagram illustrating reauthorization of the cloud service.

FIG. 10 is a sequence diagram illustrating reauthorization processing. The apparatuses illustrated in the sequence diagram communicate with each other through HTTPs.

The processing in steps S901 and S902 in FIG. 10 is similar to the processing in steps S601 and S602 in FIG. 6.

In step S1001, the user presses the Reauthorize button 406. This enables the PC 302 to transmit a request for reauthorizing the button name "Button 1" to the image forming apparatus 100.

In step S1002, the image forming apparatus 100 transmits a request for an authentication page URL to the mediation server 301 together with the unique ID and the completion notification redirection URL. The unique ID saved in step S608 is attached to the request. Similarly to step S608, the management screen URL of the Cloud Link Print & Scan is specified as the completion notification redirection URL.

The subsequent processing in steps S909 to S918 is similar to the processing in steps S609 to S618 in FIG. 6.

In the present exemplary embodiment, the mediation server 301 mediates between the image forming apparatus 100 and the cloud service 304. Alternatively, the image forming apparatus 100 and the cloud service 304 may perform transmission and reception of data, such as a URL and a token, directly not via the mediation server 301.

The reauthorization processing is performed through the above-described sequence, so that the image forming apparatus 100 can use a service of the cloud service 304 via the mediation server 301 again. In a case where the management screen in FIG. 4 is displayed, the user can start the reauthorization processing by simply accessing the image forming apparatus 100 from the browser of the PC 302 and pressing the Reauthorize button 406, which saves the user from having to perform operations other than the reauthorization processing on the cloud service.

A second exemplary embodiment of the present disclosure will be described.

Figure 12:
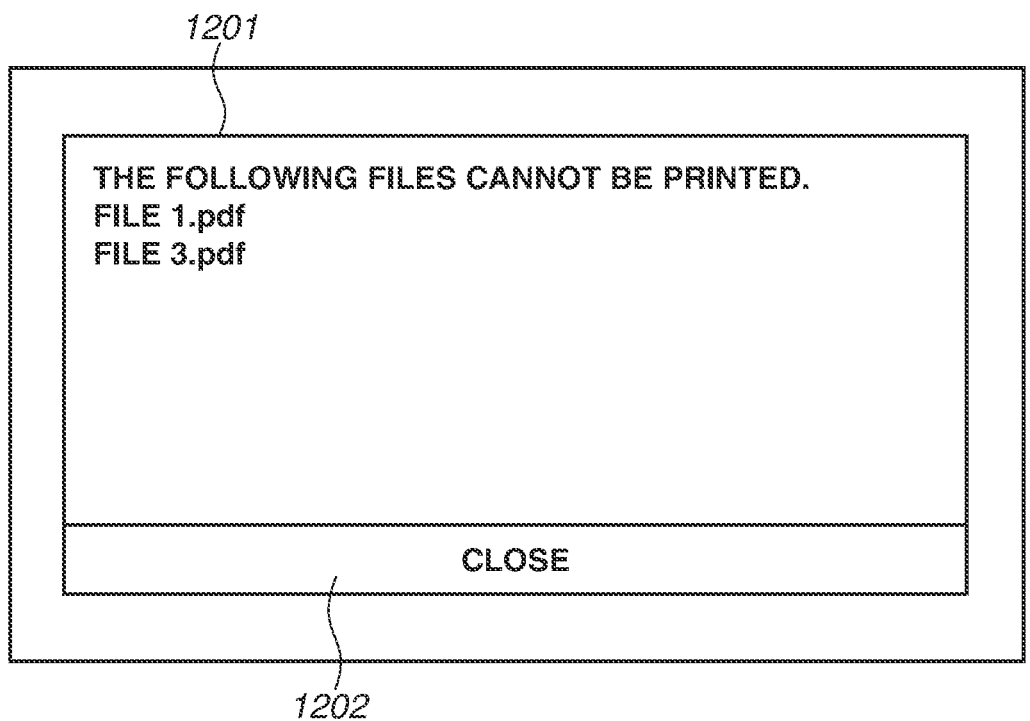
FIG. 12 is a diagram illustrating a screen displayed on the image forming apparatus, which displays a list of files failed to be printed.

FIG. 12 illustrates a screen displayed on the operation unit 106 of the image forming apparatus 100 in a case where there is a file that is unable to be downloaded due to a communication error and has failed to be submitted as a print job in the print execution processing in step S913. A list of names of failed files is displayed on a failed file list 1201. The screen is closed when a Close button 1202 is pressed.

Figure 13:
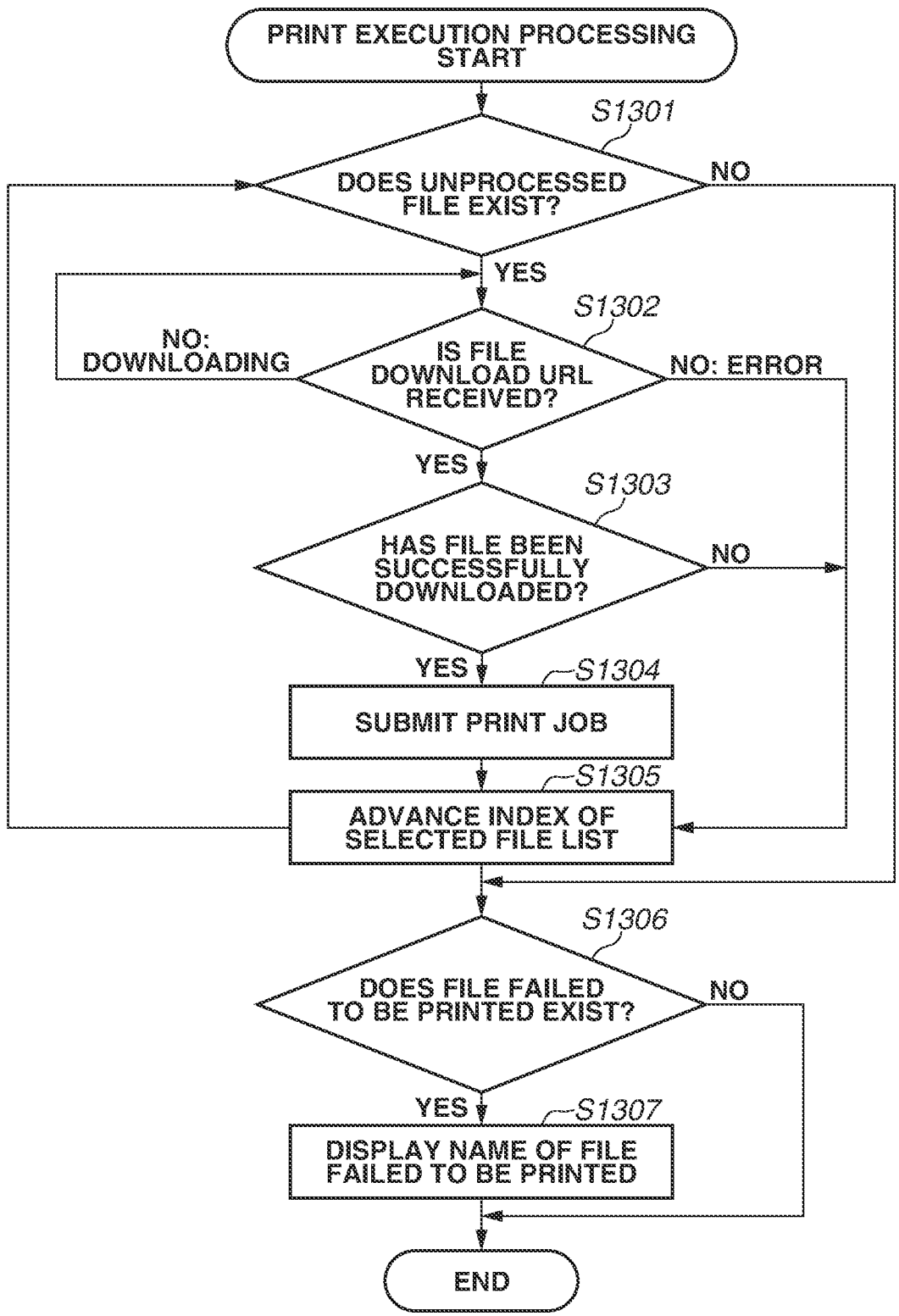
FIG. 13 is a flowchart illustrating processing to be performed when the Cloud Link Print is executed.

FIG. 13 is a flowchart illustrating details of the print execution processing in step S913. The processing in this flowchart is implemented by the CPU 101 loading a program stored in the ROM 103 into the RAM 102 and executing the program.

In step S1301, based on the selected file list generated in step S911, the CPU 101 determines whether an unprocessed file exists. If an unprocessed file exists (YES in step S1301), the processing proceeds to step S1302. If an unprocessed file does not exist (NO in step S1301), the processing proceeds to step S1306.

In step S1302, the CPU 101 requests the mediation server 301 to provide a download URL of a first unprocessed file in the selected file list. The download URL refers to the URL from which the image forming apparatus 100 downloads the file. The image forming apparatus 100 cannot directly access a file saved in the cloud service 304. Thus, the mediation server 301 downloads the file to a location where the image forming apparatus 100 can access, and returns the URL of the location to the image forming apparatus 100. In this way, the image forming apparatus 100 can download the file. If the download URL is returned from the mediation server 301 (YES in step S1302), the processing proceeds to step S1303. If information indicating a status of downloading is returned (NO: DOWNLOADING in step S1302), the processing proceeds to step S1302 to request the URL again. If some error is returned (NO: ERROR in step S1302), the processing proceeds to step S1305.

In step S1303, the CPU 101 is to download the file from the download URL. If the file has been successfully downloaded (YES in step S1303), the processing proceeds to step S1304. If the file has failed to be downloaded (NO in step S1303), the processing proceeds to step S1305.

In step S1304, the CPU 101 submits the downloaded file to the job control unit 203 as a print job. In a case where an unprocessed file exists, print processing is to be performed concurrently with the subsequent download processing. Because the print processing departs from an essential point, detailed description thereof will be omitted.

In step S1305, the CPU 101 advances an index of the selected file list by one. At this time, if the processing has been shifted to step S1305 from step S1302 or S1303, the CPU 101 lists the file as a failed file.

In step S1306, the CPU 101 determines whether a failed file exists. If a failed file exists (YES in step S1306), the processing proceeds to step S1307. If a failed file does not exist (NO in step S1306), the print execution processing is ended.

In step S1307, the CPU 101 displays, on the operation unit 106, the failed file list screen illustrated in FIG. 12.

Through the processing in the flowchart, the printing of a file saved in the cloud service 304 is executed, and if there is a file failed to be printed, the user can be informed of the failed file.

According to the exemplary embodiments of the present disclosure, it is possible to minimize a series of operation procedures performed by the user to issue the access token again.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus connectable to a first external apparatus and a second external apparatus, the information processing apparatus comprising:
   one or more controllers including one or more processors and one or more memories, the one or more controllers configured to:
      control storing a first access token issued in the second external apparatus and an identifier in the one or more memories, the identifier being associated with an instruction portion of the first external apparatus for executing predetermined processing; and
      transmit data to the second external apparatus using the first access token,
      wherein the first access token is updated by a second access token re-issued in the second external apparatus.

2. The information processing apparatus according to claim 1, wherein the predetermined processing is scan processing, and the instruction portion is a scan button associated with scan settings.

3. The information processing apparatus according to claim 1, wherein the predetermined processing is print processing, and the instruction portion is a print button associated with print settings.

4. The information processing apparatus according to claim 1, wherein the first access token and the second access token are tokens used to transmit data to the second external apparatus.

5. The information processing apparatus according to claim 1, wherein the one or more controllers are further configured to:
   receive the identifier from the first external apparatus; and
   control storing the received identifier associated with the first access token in the one or more memories.

6. The information processing apparatus according to claim 1, wherein the one or more controllers are further configured to:
   transmit a request to issue an access token to the second external apparatus; and
   receive the second access token issued in the second external apparatus in response to the request.

7. A method for controlling an information processing apparatus connectable to a first external apparatus and a second external apparatus, the method comprising:
   controlling storing a first access token issued in the second external apparatus and an identifier in the one or more memories, the identifier being associated with an instruction portion of the first external apparatus for executing predetermined processing; and
   transmitting data to the second external apparatus using the first access token,
   wherein the first access token is updated by a second access token re-issued in the second external apparatus.

8. The method according to claim 7, wherein the predetermined processing is scan processing, and the instruction portion is a scan button associated with scan settings.

9. The method according to claim 7, wherein the predetermined processing is print processing, and the instruction portion is a print button associated with print settings.

10. The method according to claim 7, wherein the first access token and the second access token are tokens used to transmit data to the second external apparatus.

11. The method according to claim 7, further comprising:

receiving the identifier from the first external apparatus; and controlling storing the received identifier associated with the first access token in the one or more memories.

12. The method according to claim 7, further comprising:

transmitting a request to issue an access token to the second external apparatus; and receiving the second access token issued in the second external apparatus in response to the request.

13. A non-transitory computer-readable storage medium storing a computer program for causing a computer to perform a method for controlling an information processing apparatus connectable to a first external apparatus and a second external apparatus, the method comprising:

controlling storing a first access token issued in the second external apparatus and an identifier in the one or more memories, the identifier being associated with an instruction portion of the first external apparatus for executing a predetermined processing; and transmitting data to the second external apparatus using the first access token, wherein the first access token is updated by a second access token re-issued in the second external apparatus.

* * * * *